US009143488B2

(12) United States Patent
St-Germain et al.

(10) Patent No.: US 9,143,488 B2
(45) Date of Patent: Sep. 22, 2015

(54) REAL-TIME ENCRYPTION OF VOICE AND FAX OVER IP

(71) Applicant: BABYTEL INC., Montreal (CA)

(72) Inventors: Pierre St-Germain, Montreal (CA); Cesar Hernandez, Montreal (CA); Khaled Tewfik, Saint-Lazare (CA); Gaetan Sheridan, Montreal-Nord (CA)

( * ) Notice: Subject to any disclaimer, the term of this patent is extended or adjusted under 35 U.S.C. 154(b) by 0 days.

(21) Appl. No.: 14/195,411

(22) Filed: Mar. 3, 2014

(65) Prior Publication Data

US 2015/0188895 A1 Jul. 2, 2015

Related U.S. Application Data (60) Provisional application No. 61/921,575, filed on Dec. 30, 2013.

(51) Int. Cl.
*H04L 9/00* (2006.01)
*H04L 29/06* (2006.01)
*H04M 1/253* (2006.01)

(52) U.S. Cl.
CPC .......... *H04L 63/0471* (2013.01); *H04L 63/02* (2013.01); *H04L 63/0281* (2013.01); *H04L 63/166* (2013.01); *H04M 1/2535* (2013.01)

(58) Field of Classification Search
CPC . H04L 63/0471; H04L 63/02; H04L 63/0281; H04L 63/166; H04M 1/2535
USPC ............................. 713/153; 370/401; 709/203
See application file for complete search history.

(56) References Cited

U.S. PATENT DOCUMENTS

| 5,587,809 | A   | * | 12/1996 | Le Corre et al. ............... 358/405 |
|-----------|-----|---|---------|----------------------------------------|
| 6,233,234 | B1  | * | 5/2001  | Curry et al. .................... 370/356 |
| 6,240,186 | B1  | * | 5/2001  | Hyde et al. ..................... 380/255 |
| 6,289,382 | B1  | * | 9/2001  | Bowman-Amuah .......... 709/226 |
| 6,865,672 | B1  | * | 3/2005  | Carmeli .......................... 713/155 |
| 7,565,526 | B1  | * | 7/2009  | Shaw et al. .................... 713/150 |
| 7,661,131 | B1  | * | 2/2010  | Shaw et al. ...................... 726/15 |
| 8,355,323 | B2  |   | 1/2013  | Kumarasamy et al. |
| 8,587,801 | B2  |   | 11/2013 | Fahrenthold |
| 8,726,015 | B2  | * | 5/2014  | Bouchard ...................... 713/165 |
| 2002/0004899 | A1 | * | 1/2002  | Azuma ......................... 713/152 |
| 2002/0129108 | A1 | * | 9/2002  | Sykes, Jr. ...................... 709/206 |
| 2004/0054792 | A1 | * | 3/2004  | Pitsos ........................... 709/229 |
| 2004/0181661 | A1 | * | 9/2004  | Ferltsch et al. ............... 713/153 |
| 2004/0196833 | A1 |   | 10/2004 | Dahan et al. |
| 2004/0220996 | A1 | * | 11/2004 | Huang et al. .................. 709/201 |
| 2008/0003964 | A1 | * | 1/2008  | Alperin et al. ............. 455/185.1 |
| 2008/0117474 | A1 |   | 5/2008  | Miura |
| 2010/0208726 | A1 | * | 8/2010  | Oliszewski et al. ........... 370/352 |
| 2010/0251000 | A1 | * | 9/2010  | Lyne et al. ........................ 714/2 |
| 2011/0179266 | A1 | * | 7/2011  | Popesco ........................ 713/153 |
| 2014/0281487 | A1 | * | 9/2014  | Klausen et al. ............... 713/153 |

* cited by examiner

*Primary Examiner* — Haresh N Patel
(74) *Attorney, Agent, or Firm* — Benoit & Cote Inc.

(57) ABSTRACT

A method for encrypting application layer packets, including UDPTL data used by T.38 FOIP devices, for securing transmission of Fax communications over the Internet. In one embodiment, a client side SIPCryptAgent is provided and operably installed on the user's Fax or Voice over IP server/device. Similarly, a server side SIPCryptAgent is installed on the SBC servers at the service provider. The client side SIPCryptAgent acts as a proxy for the Fax device thereby receiving all data sent out by the Fax device and encrypting the SIP and media packets of the Fax device using a lightweight protocol before sending them to the SBC servers. Similarly, the server side acts as a proxy for the SBC servers and encrypts outgoing data and decrypts incoming data so that the exchange of data over the Internet between the client side CryptAgent and the server side CryptAgent is done in a secure, encrypted and real time manner.

13 Claims, 12 Drawing Sheets

FIGURE 1

PRIOR ART

REAL-TIME ENCRYPTION OF VOICE AND FAX OVER IP

RELATED APPLICATIONS

This application claims priority from co-owned US provisional Application No. 61/921,575 filed on Dec. 30, 2013, which is incorporated herein by reference in its entirety.

BACKGROUND (a) Field

The subject matter disclosed generally relates to the field of fax and voice over IP. More specifically, the present disclosure relates to real-time fax over IP communications.

(b) Related Prior Art

Session Initiation Protocol (SIP) is used to control multimedia communications over Internet Protocol (IP) networks.

The market for consumer SIP devices is always expanding. For example, SIP is currently being used in voice over IP, fax communications, video surveillance etc.

Figure 1:
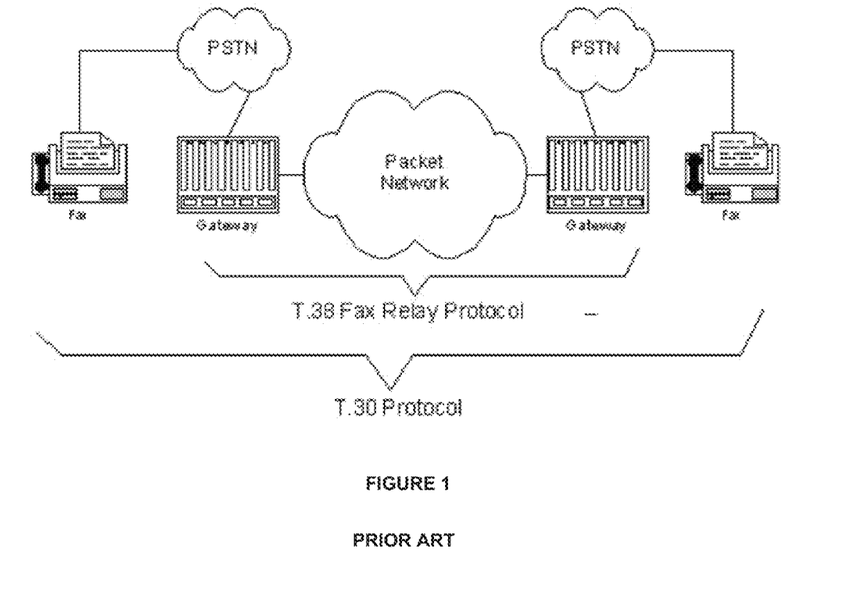
FIG. 1 illustrates a conventional architecture of Fax Over IP communications.

At the same time, the concerns about the security of SIP communications over the public Internet are also increasing. The Secure SIP (sSIP) protocol when used with Secure Real Time Protocol (sRTP) can be used to secure audio communications and in turn fax when treated as audio. Proper fax communication however requires use of the T.38 protocol, which treats fax as digital data instead of audio. FIG. 1 illustrates a conventional architecture of real-time Fax Over IP communications using SIP for signaling and User Datagram Protocol Transport Layer (UDPTL) for transporting the T.38 fax media. Unlike sRTP, there does not exist a method/system for securing UDPTL. At the same time T.38 Fax Devices do not support SRTP for transporting the T.38 fax media and therefore can not secure fax communications over IP.

As a result, SIP-based, T.38 Fax communications are transferred over a packet network (such as the Internet) without any security as to authenticity, integrity and confidentiality of the Fax communications being transferred.

Therefore, there is a need in the market for a system and method for securing SIP/UDPTL based T.38 Fax over IP communications.

SUMMARY

The present embodiments describe such system and method.

In one aspect, there is provided a method for securing Fax Over IP (FOIP) communications exchanged in real-time between a T.38 Fax server and a Session Border Controller (SBC) server, the method comprising: operably installing or connecting a client side CryptAgent (BCA-CA) to the T.38 fax server; configuring the BCA-CA as a proxy for the T.38 fax server; operably installing or connecting a server side CryptAgent (BCA-SE) to the SBC server; configuring the BCA-SE as a proxy for the SBC server; the BCA-CA encrypting outgoing application data packets received from the T.38 Fax server and sending the encrypted packets to the BCA-SE over the Internet; the BCA-SE decrypting the encrypted packets received from the BCA-CA and sending the decrypted packets to the SBC server; thereby securing fax communications sent over the Internet using existing communication protocols.

In another aspect, there is provided a method for securing Fax Over IP (FOIP) communications exchanged in real-time between a Fax server and a Session Border Controller (SBC) server, the method comprising: operably installing or connecting a client side CryptAgent (BCA-CA) to the fax server; configuring the BCA-CA as a proxy for the fax server; the BCA-CA encrypting outgoing application layer packets received from the Fax server and sending the encrypted packets over the Internet to the SBC server for decrypting, the encrypting comprising scrambling header data and payload data of the application layer that define a UDP payload to eliminate original structure of the application layer; and/or the BCA-CA decrypting encrypted packets received from the SBC server and sending the decrypted packets to the FAX server, the decrypting comprising retrieving scrambled header data and payload data of the application data to retrieve original structure of the application layer; thereby securing fax communications sent over the Internet using existing communication protocols.

In a further aspect, there is provided a method for securing Fax Over IP (FOIP) communications exchanged in real-time between a Fax server and a Session Border Controller (SBC) server, the method comprising: operably installing or connecting a server side CryptAgent (BCA-SE) to the SBC server; configuring the BCA-SE as a proxy for the SBC server; the BCA-SE encrypting outgoing application layer packets received from the SBC server and sending the encrypted packets over the Internet to the BCA-CA for decrypting, the encrypting comprising scrambling header data and payload data of the application layer that make up a UDP payload to eliminate original structure of the application layer; and/or the BCA-SE decrypting encrypted packets received from the BCA-CA and sending the decrypted packets to the SBC server, the decrypting comprising retrieving scrambled header data and payload data of the application data to retrieve original structure of the application layer; thereby securing fax communications sent over the Internet using existing communication protocols.

The embodiments describe a method for safeguarding the authenticity, integrity and confidentiality of real-time fax communications over the public IP network (Internet) by encrypting all Session Initiation Protocol (SIP) signaling and media packets, including T.38 packets carrying T.30 signaling and digitized image data, (i.e., encrypting audio and fax traffic) exchanged in real-time, (i.e. preserving all elements of the T.30 fax communication protocol) over the Internet, between a SIP User Agent Client (UAC) and a Session Border Controller (SBC) server via a SIP User Agent Client Proxy (UACP) residing in the same Local Area Network (LAN) as the SIP UAC and via a SIP User Agent Server Proxy (UASP) residing in the same Local Area Network (LAN) as the SBC, the method comprising:

the SIP UACP initiating an HTTPS session between itself and the SIP UASP;

the SIP UACP requesting an encryption key from the SIP UASP;

the SIP UACP receiving a generated encryption key from the SIP UASP;

the SIP UAC sending and receiving all SIP signaling and media packets to the SIP UACP;

the SIP UACP encrypting all SIP signaling and media packets received from the SIP UAC, using the generated encryption key, and sending the encrypted packets to the SIP UASP;

the SIP UACP decrypting all SIP signaling and media packets received from the SIP UASP, using the generated encryption key, and sending the decrypted packets to the SIP UAC;

the SIP UASP authenticating the SIP UACP;

the SIP UASP decrypting all SIP signaling and media packets received from the SIP UACP, using the generated encryption key, and sending the decrypted packets to a local SBC for routing;

the SIP UASP encrypting all SIP signaling and media packets received from a local SBC and intended for the SIP UACP, using the generated encryption key, and sending the encrypted packets to the SIP UACP.

The embodiments describe a method for securing Fax Over IP (FOIP) communications exchanged in real-time between a SIP User Agent Client (UAC) and a Session Border Controller (SBC) server via a SIP User Agent Client Proxy (UACP) residing in the same Local Area Network (LAN) as the SIP UAC, the method comprising: the SIP UACP initiating an HTTPS session with the SBC; the SIP UACP requesting an encryption key from the SBC; in response to the request, receiving a generated encryption key at the SIP UACP from the SBC; configuring the SIP UAC to send and receive all SIP signaling and media packets to the SIP UACP; at the SIP UACP, encrypting all SIP signaling and media packets received from the SIP UAC, using the generated encryption key, and sending the encrypted packets to the SBC; the SIP UACP decrypting all SIP signaling and media packets received from the SBC, using the generated encryption key, and sending the decrypted packets to the SIP UAC.

The embodiments describe a method for securing Fax Over IP (FOIP) communications exchanged in real-time between a SIP User Agent Client (UAC) and a Session Border Controller (SBC) server via a SIP User Agent Server Proxy (UASP), the method comprising: at the SIP UASP, receiving a request for an encryption key from the SIP UAC; in response to the request, generating the encryption key at the SIP UASP and sending the generated encryption key to the SIP UAC; receiving encrypted SIP signaling and media packets received from the SIP UAC; the SIP UASP decrypting the received SIP signaling and media packets using the generated encryption key, and sending the decrypted signaling and media packets to a local SBC; the SIP UASP encrypting all SIP signaling and media packets received from the local SBC and intended for the SIP UAC, using the generated encryption key, and sending the encrypted packets to the SIP UAC.

The embodiments describe a method for encrypting digitized images (i.e., encrypting faxes) exchanged in real-time between a SIP User Agent (UA, client) and a Session Border Controller (SBC, server), the method comprising: initiating an HTTPS session between the SIP UA and the SBC; requesting an encryption key from the SBC; receiving a generated encryption key at the SIP UA; encrypting outgoing digitized images using the generated encryption key and/or decrypting received digitized images using the generated encryption key.

Definitions

In the present document, the following terms are defined as follows:

Session Initiation Protocol (SIP) is a signaling protocol used to control multimedia communications over Internet Protocol (IP) networks.

Real Time Protocol (RTP) defines a standard packet format for delivering audio and video media over IP networks in real time.

T.38 Protocol (T.38) is an ITU recommendation describing a method for the transmission of fax over IP networks in real time.

User Datagram Protocol Transport Layer (UDPTL) is the predominant means for transporting T.38 data over an IP network. Note that while T.38 ITU recommendation provides the option to carry fax packets within an RTP stream, implementations supporting this option instead of making use of UDPTL are very rare.

SIP User Agent (SIP-UA) is a network end-point that initiates or responds to SIP messages and manages a SIP session. During a particular SIP transaction the SIP-UA can perform the role of a User Agent Client (UAC), which sends SIP requests or a User Agent Server (UAS), which receives the requests and returns a SIP response.

SIP Proxy is an intermediary server that acts both as server (UAS) and client (UAC) for the purpose of making requests on behalf of other clients. In the present embodiments, communications between a SIP User Agent Client (UAC) and a Session Border Controller (SBC) server occur via a SIP User Agent Client Proxy (UACP) residing in the same Local Area Network (LAN) as the SIP UAC and a SIP User Agent Server Proxy (UASP) residing in the same Local Area Network (LAN) as the SBC. In some embodiments the UACP may be integrated directly into the UAC and appear as one. In some embodiments the UASP may be integrated directly into the SBC and appear as one.

Session Border Controller (SBC) is a network edge server that sits between external UA equipment and internal SIP servers and is responsible for various functions including network topology hiding, NAT traversal, malformed packet protection, media transcoding, etc.

ITSP is a short form of Internet Telephony Service Provider.

BCA is a short form of the BabyTel-Crypt-Agent architecture, which is the overall architecture described in the present document. The SIP User Agent Client Proxy is also referred to as the BCA Client Application (BCA-CA), while the SIP User Agent Server Proxy is also referred to as the BCA Sever Engine (BCA-SE).

UA is a short form of User Agent.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive or the full scope of the subject matter asset forth in the claims. For example, while the present describes mainly embodiments of T.38 fax communications over IP, scope extends equally to other types of media communications over IP, such as voice, video, etc.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

As discussed above, T.38 Fax Devices that do not support transmitting T.38 media using SRTP would not work for sending fax communications securely over IP. The present embodiments describe a method for encoding UDPTL packets used by FOIP devices for securing transmission of Fax communications over the Internet. In one embodiment, a client side SIPCryptAgent, referred to as the babyTEL CryptAgent Client Application (BCA-CA), is provided and operably installed on the user's Fax or Voice over IP server/device. Similarly, a server side SIPCryptAgent, referred to as the babyTEL CryptAgent Server Engine (BCA-SE) is installed on the SBC servers at the server provider facility. The client side SIPCryptAgent (BCA-CA) acts as a proxy for the Fax device thereby receiving all data sent out by the Fax device and encrypting the UDPTL packets of the Fax device using a lightweight protocol before sending them to the SBC servers. Similarly, the server side (BCA-SE) acts as a proxy for the SBC servers and encrypts outgoing data and decrypts incoming data so that the exchange of data over the Internet between the client side CryptAgent (BCA-CA) and the server side CryptAgent (BCA-SE) is done in a secure and real time manner.

Figure 2:
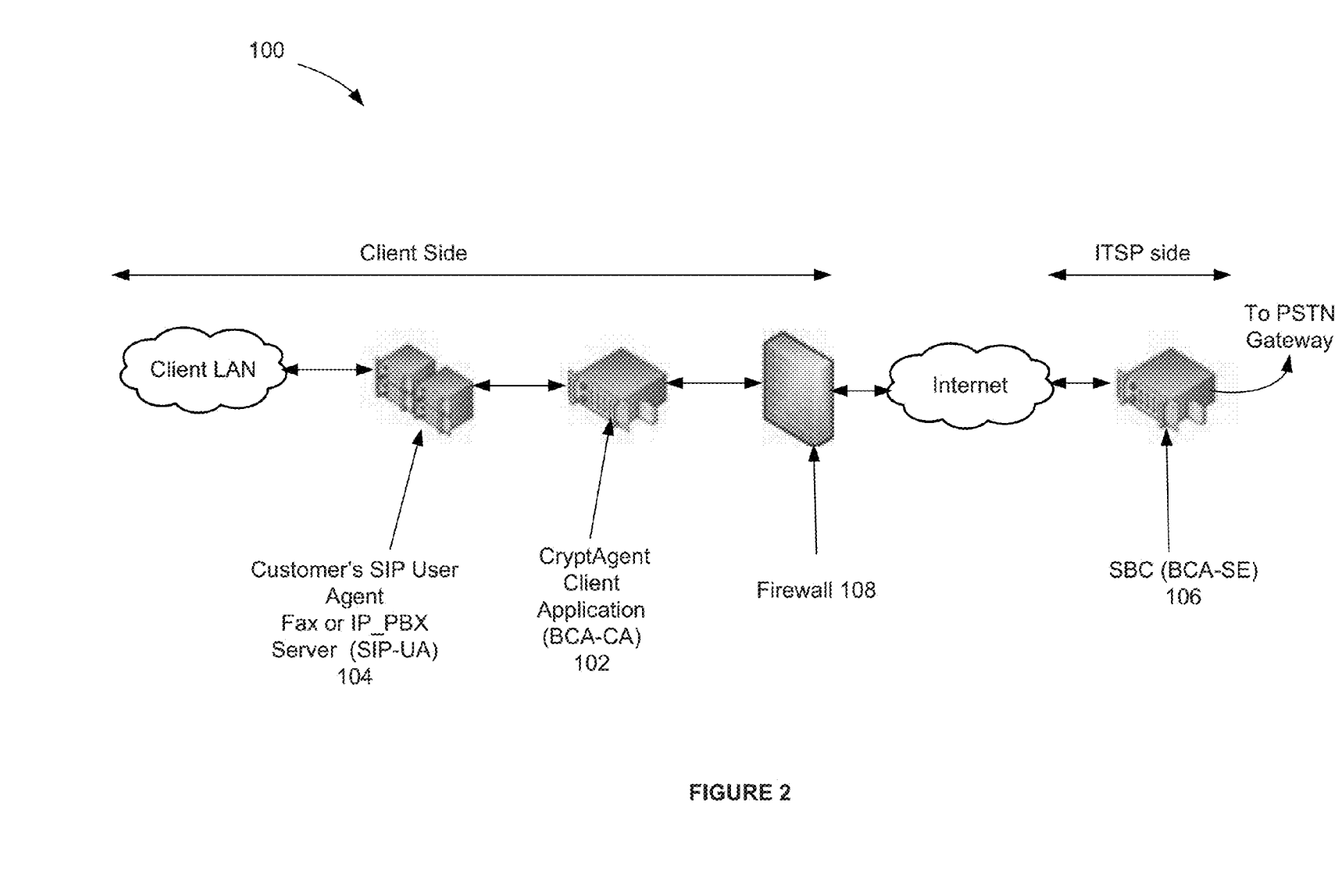
FIG. 2 illustrates an example of the overall architecture for securing SIP communications, in accordance with an embodiment.

The embodiments describe a system and method for securing SIP and media communications between a user's SIP server and the SBC servers using a lightweight encryption protocol that allows for sending the encrypted data while still using the same communication protocol e.g. without increasing the overhead. In a non-limiting example of implementation, the BCA-CA SIPCryptAgent may be installed behind the corporate firewall as exemplified in FIG. 2. FIG. 2 illustrates an example of the overall BCA architecture for securing SIP communications, in accordance with an embodiment.

In the embodiment of FIG. 2, the BCA architecture 100 comprises a client side application (BCA-CA 102) and an ITSP Server Engine side application (BCA-SE 106). The BCA-CA 102 runs locally on the SIP-UA 104 server or a standalone server on the customer's LAN and acts as the interface between the customer's SIP-UA 104 and the BCA-SE 106. The BCA-SE 106 is integrated within the Session Border Controller (SBC) 106 elements located at the ITSP network edge and acts as the interface between the BCA-CA 102 and the ITSP network. As shown in FIG. 2, the BCA-CA 102 is provided behind (logically) the Firewall 108.

Figure 2B:
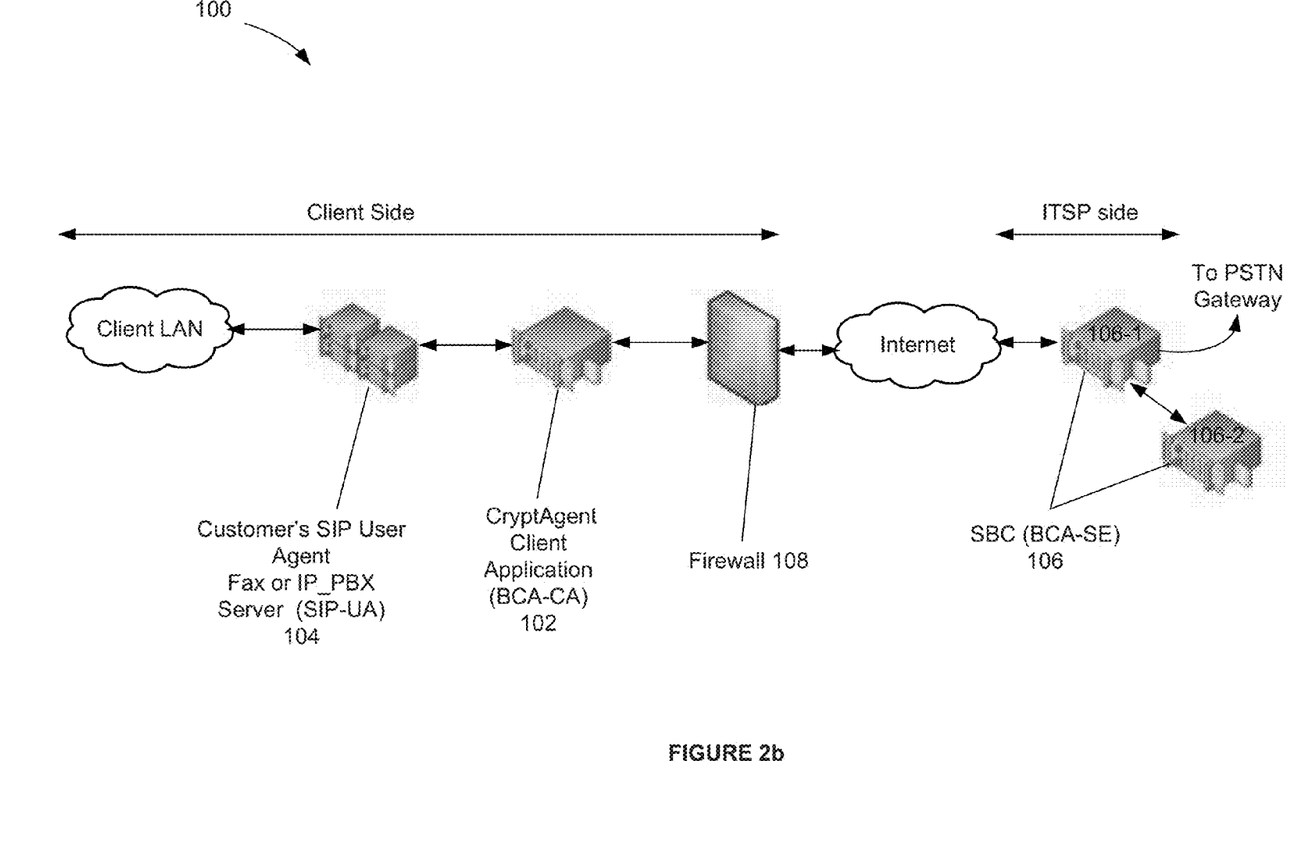
FIG. 2b illustrates an alternative embodiment in which the BCA architecture includes two or more SBC servers 106 provided in parallel.

FIG. 2b illustrate an alternative embodiment in which the BCA architecture includes two or more SBC servers 106 provided in parallel. In the embodiment, of FIG. 2b each SBC server 106 is an alternate of the other to ensure continuous availability of at least one SBC server for the secure session to avoid situations where the unavailability of the SBC server causes termination of the current session and failure of the fax call.

In an embodiment, the BCA-CA 102 and the BCA-SE 106 are proxies. For example, the BCA-CA acting as a user agent proxy may be provided at the customer network border side and the BCA-SE acting as a local proxy may be provided at the ITSP network border side. The client side proxy typically resides in the same Local Area Network (LAN) as the user agent, and is referred to as the SIP User Agent Client Proxy or SIP UACP.

The BCA architecture 100 relays both SIP signaling and media packets between the customer's SIP-UA 104 and ITSP network in order to perform the following two functions:

Encryption: The BCA can secure all messages between the customer's SIP-UA 104 and the ITSP network using encryption. In this case the BCA-CA 102 encrypts traffic from the SIP-UA 104 before relaying it to the BCA-SE 106 and decrypts traffic from the BCA-SE 106 before relaying it to the SIP-UA 104. Similarly the BCA-SE 106 encrypts traffic from the ITSP network core before relaying it to the BCA-CA 102 and decrypts traffic from the BCA-CA 102 before relaying it to the ITSP network core.

Authentication: The BCA can authenticate with the ITSP network core on behalf of the customer's SIP-UA 104 when the SIP-UA 104 does not support SIP authentication. In this case, the BCA-CA 102 must be configured with the SIP credentials of the customer and a local IP address of the SIP-UA 104 for whom authentication with the ITSP is performed.

In operation, an HTTPS session is created for communication between the client (BCA-CA) 102 and server (BCA-SE) 106. An encryption key is requested by the BCA-CA 102 and provided by the BCA-SE 106. The BCA-CA 102 uses the key to encrypt all SIP (signaling and media) traffic to the BCA-SE 106 and decrypt all SIP traffic from the BCA-SE 106. An example is shown in FIG. 3.

Figure 3:
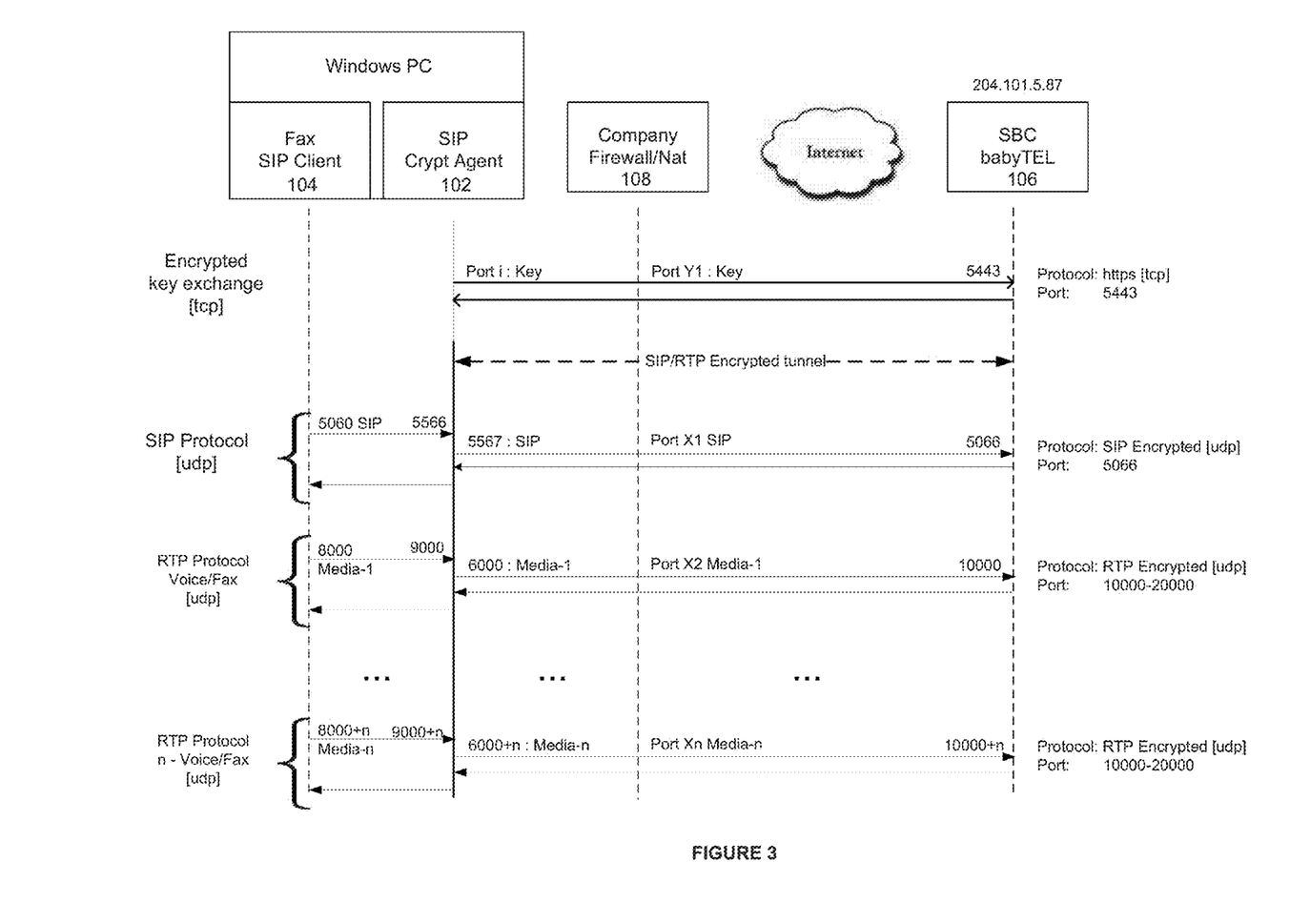
FIG. 3 illustrates the traffic flow in a secure BCA architecture in accordance with an embodiment.

FIG. 3 illustrates the traffic flow in a secure BCA architecture 100 in accordance with an embodiment.

As shown in FIG. 3, the customer side SIPCryptAgent 102 initiates a session with the SBC 106 and requests an encryption key. Subsequent SIP communications (received and sent through the firewall 108) are encrypted and decrypted using the generated encryption key. The SIP client 104 sends all media packets to the SIPCryptAgent(BCA-CA) 102, and the latter encrypts these packets using this key before sending them to the BCA-SE 106, residing in the SBC. Similarly, the packets, intended for the SIP Client 104, received from the BCA-SE 106 and addressed to the SIP CryptAgent 104 are decrypted before being sent to the SIP Client 104.

At the ITSP, the BCA-SE 106 receives the packets, decrypts encrypted packets then applies regular SBC processing. Thus establishing a secure SIP connection from the customer's internal SIP-UA 104 to the ITSP network core. The customer's SIP-UA 104 is the one initiating the communication by performing a periodic SIP registration to establish and maintain a communication channel on which to receive SIP invite messages from the ITSP network core to establish an incoming call session or by sending a SIP invite message to the ITSP network to initiate an outgoing call session.

In an embodiment, the encryption keys are changed periodically e.g. every 1 or 2 hours, as an added security measure so that if the encryption keys are hacked, the hacker would have to re-obtain them again.

When the Authentication function is enabled, the BCA-CA 102 will intercept and respond to any SIP authentication challenge issued by the ITSP network core. In this way, the SIP-UA 104 will only receive the final response to a SIP registration or invite. The BCA creates very minimal overhead that is negligible with respect to bandwidth and latency. Additional traffic is only initiated by the BCA when the Encryption function is enabled, to periodically generate and exchange encryption keys between the BCA-CA 102 and BCA-SE 106, and when the Authentication function is enabled, to respond to SIP authentication challenges from the ITSP network core.

Figure 4:
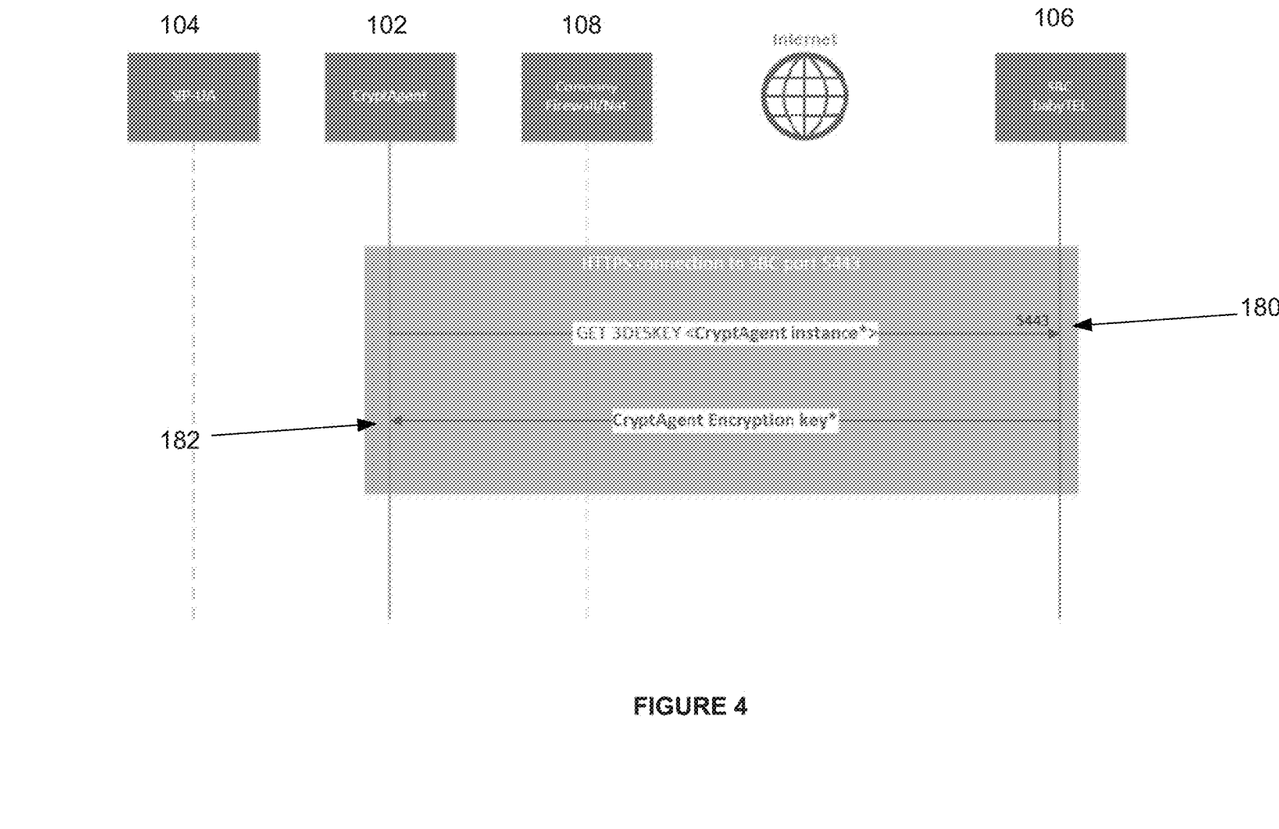
FIG. 4 illustrates the authentication step in a secure BCA architecture, in accordance with an embodiment.

FIG. 4 illustrates the authentication step in a secure BCA architecture, in accordance with an embodiment. As shown in FIG. 4, the client side CryptAgent 102 initiates an HTTPS session with the server side CryptAgent 106 associated with the SBC server. During this session the CryptAgent 106 generates an encryption key at step 180. In response to the request, the CryptAgent associated with the SBC 160 provides the encryption keys at step 182. The encryption keys thus exchanged will be used for encrypting subsequent fax and media communications between the Fax device 104 and the SBC servers 106.

Figure 5:
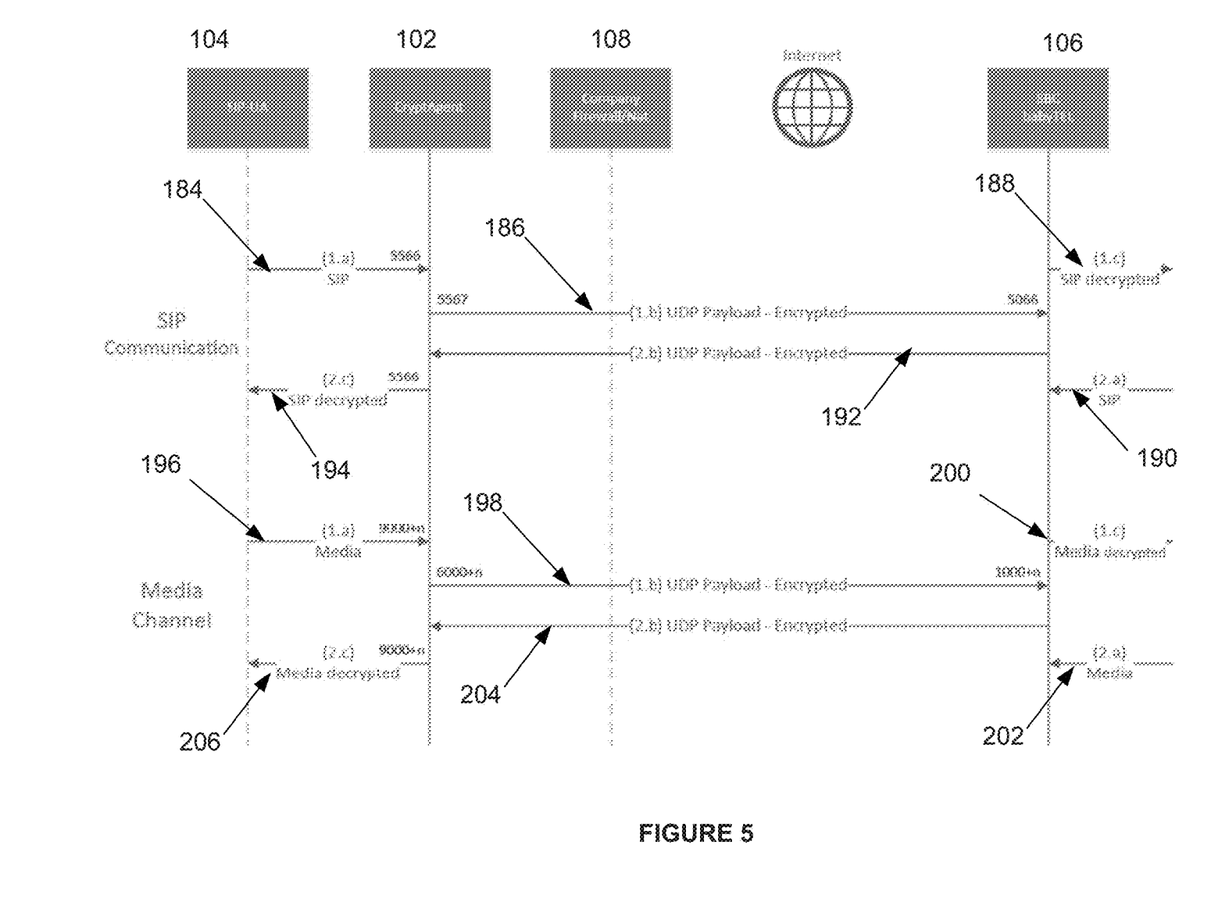
FIG. 5 illustrates the secure media and fax exchange in a secure BCA architecture, in accordance with an embodiment

FIG. 5 illustrates the secure media and fax exchange in a secure BCA architecture, in accordance with an embodiment. FIG. 5 illustrates the two scenarios of media and SIP communications between the SIP user agent 104 and the SBC 106. As shown at 184, the SIP user agent 104 sends a SIP message to the CryptAgent 102. The latter modifies the message at 186 to encrypt its content using the encryption keys and sends the encrypted message to the server side CryptAgent 106. The latter will decrypt the message and send the decrypted message to the SBC server at 188 which will send the message to the internal network.

Similarly, communications sent in the reverse directions are sent to the server side CryptAgent 106 at 190 from the internal network. The CryptAgent 190 modifies the message using the encryption keys and sends the encrypted message to the client side CryptAgent 102 at 192. The latter will decrypt the encrypted message at 194 and will pass it to the SIP User Agent 104 (e.g. FOIP device).

Media communications follow the same route as exemplified at steps 196, 198, 200, 202, 204, and 206.

Figure 6:
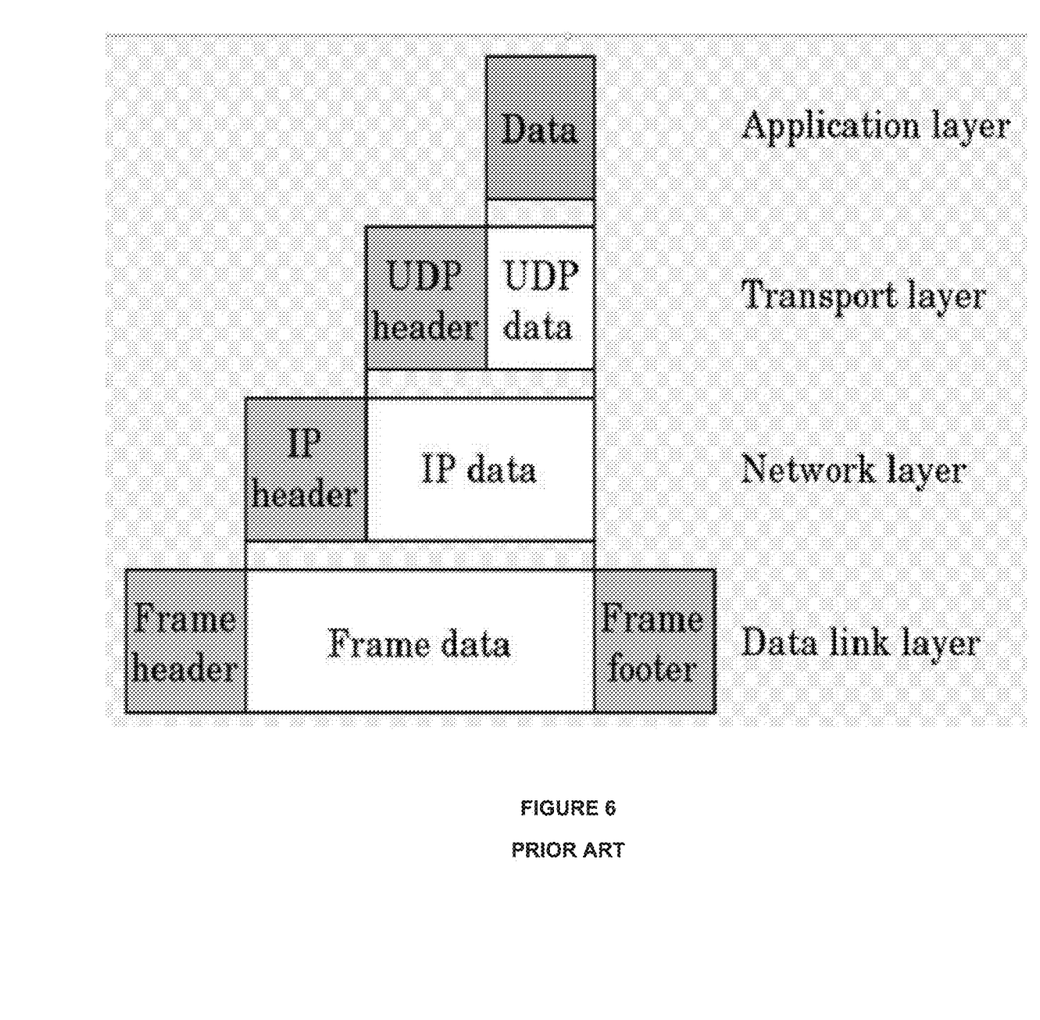
FIG. 6 illustrates an example of the layers in a conventional UDP payload.

FIG. 6 illustrates an example of the layers in a conventional UDP payload. As shown in FIG. 6, data at the application layer is serlaized for transmission as UDP payload at the transport layer, which is carried by the network layer over the data link layer. At the Application Layer, "Application Data" can be SIP, UDPTL, RTP, SRTP, Voice, FAX, Video, etc. This data becomes "UDP Data" at the transport layer. In an embodiment, the encryption protocol may be adapted to perform a complete encryption of the application data i.e. the entire UDP data packet. After encryption, the IP data will be made up of the UDP header and UDP data, which will be scrambled such that there will not be any header associated with a specific application layer protocol (SIP, UDPTL, RTP, SRTP, etc). The UDP header, IP header and Frame header need to remain in their original state to be able to be relayed to the right destination. After decryption the original structure is retrieved and the decrypted packet is sent to the destination after being securely transmitted over the Internet.

Figure 5B:
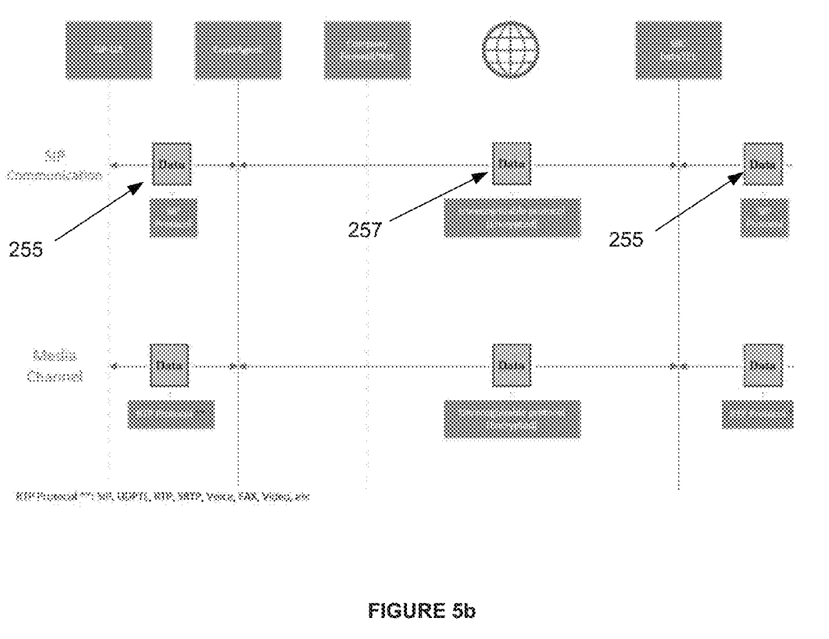
FIG. 5b illustrates an example of a SIP message exchange using the secure BCA architecture in accordance with the present embodiments.

An example is illustrated with respect to FIG. 5b. Consider the case of a SIP message 255 that needs to be sent from the BCA-CA to the BCA-SE or vice versa. An example of a SIP Message is provided below:

INVITE sip:15145556667@1.1.1.1:193 SIP/2.0
Via: SIP/2.0/UDP 204.101.5.75:5065;branch=fgdg435-j8343y-IdcPDnLhJT-2-d8754z-Max-Forwards: 69
From: <sip:18008887777@sip.babytel.ca;user=phone>; tag=1c191001895
To: <sip:15145556667@204.101.5.20;user=phone>
Call-ID: UJbeygmhCC
CSeq: 1 INVITE
Contact: <sip:fy39nAvgMY@204.101.5.75:5065; transport=UDP>
Content-Type: application/sdp
Content-Length: 323
Allow: REGISTER, INVITE, BYE, ACK, CANCEL, OPTIONS, INFO, NOTIFY
P-Called-Party-ID: <sip:15145556667@sip.babytel.ca>
Alert-Info: <Bellcore-r3>
v=0
o=AudiocodesGW 190991957 190991528 IN IP4 204.101.5.75
s=Phone-Call
c=IN IP4 204.101.5.75
t=0 0
m=audio 17810 RTP/AVP 18 0 4 101
a=rtpmap:18 G729/8000
a=fmtp:18 annexb=no
a=rtpmap:0 PCMU/8000
a=rtpmap:4 G723/8000
a=fmtp:4 annexa=no
a=rtpmap:101 telephone-event/8000
a=fmtp:101 0-15
a=ptime:20
a=sendrecv As discussed above, the SIP message 255 is encrypted using a lightweight protocol using the encryption keys to generate an encrypted message 257. The encrypted message for the SIP message exemplified above may be as follows:

19:f3:cf:c2:0c:f0:8e:da:a9:fe:6d:b1:de:10:0f:9f:c5:30:f9: 9c:87:79:74:7e:84:e0:b5:2e:ed:b3:e1:5e:d3:4c:bc:26: 24:8a:c2:7c:85:29:15:88:4a:c6:b7:dc:59:68:29:b2:56:9 9:75:53:12:1b:a5:b1:5a:e5:cf:f5:e1:d2:73:21:10:d9:4d: ae:9f:b9:f6:85:04

The encrypted message 257 is decrypted at the destination to retrieve the original message 255 as exemplified in FIG. 5b.

Authentication Bridge

There are, in the market, devices, e.g. Fax devices, that do not support SIP authentication as they were not meant to be used as trusted devices. However, such devices exist and are deployed in environments that require security. To deal with this problem and to be able to authenticate them with the SBC server, an authentication bridge capability is implemented in the CryptAgent client, so that it would intercept SIP authentication challenges from the service provider (ITSP) and respond on behalf of the device. This way the client side CryptAgent may authenticate with the SBC server on behalf of the client device that does not support authentication.

Firewall validation

Firewall restrictions blocking proper communication between a device behind the firewall and the service provider are common reasons for connectivity failure when configuring a SIP device. When connectivity problems occur, there is uncertainty as to whether the problem is firewall related or the device has been misconfigured. When the traffic is encrypted, it is not possible to diagnose problems by looking at traces, thus making it very difficult to distinguish between configuration problems and firewall problems. The challenge in verifying proper firewall behavior is that firewalls are complex and highly secure elements that only select individuals are permitted access to. Therefore there is a need to eliminate the uncertainty of whether firewall restrictions are causing SIP connectivity to fail in order to verify that the SIP device is configured properly.

In an embodiment, a SIP validator module is implemented within the CryptAgent client (BCA-CA) to address this problem. The SIP validator is configured to determine if connectivity from the SIP client network to the service provider's Session Border Controller (SBC) is possible and if not, to determine the reasons communication is blocked by the firewall. In one embodiment, see FIG. 2, the SIP validator is configured to mimic the communication between the SIP client device 104 and the SBC 106 from a device (BCA-CA) that is subject to the same firewall treatment as the actual SIP client device and resides within the same network environment so as to be subject to the same firewall rules. In another embodiment, the SIP validator of the CryptAgent runs and performs inspection and verification directly on the SIP client device so as to be subject to the same firewall rules.

The inspection looks for two common causes of firewall problems: Restrictive filtering and Network Address Translation (NAT). Restrictive filtering can happen on both UDP and TCP traffic by port, by protocol and by data type (voice, fax, video, etc). In the case of NAT, it is required that the firewall uses a Consistent NAT behavior model otherwise incoming calls can be blocked as the firewall keeps changing the public IP port used to communicate with the SBC.

The first step is to test the ports normally used for SIP and media by sending typical SIP and media data. For SIP, a SIP INVITE message is sent to the SBC and we look for a "200 OK" response. From that it is possible to determine the public IP address and port used by the firewall and to verify its Consistent NAT behavior. Multiple media tests are performed using a pre-determined set of port numbers that both the SBC and test client know. Accordingly, the SIP validator is able to determine if connectivity can be established and if not, can pin point the reason.

Network Quality Test

In addition to the firewall inspection, the SIP validator performs a network quality test while performing the media connectivity tests. To do this, it sends a series of packets consisting of real audio signals for a fixed duration and echoes them back. The data may be encoded using the G.711 codec and sent at a frequency of 20 ms per packet, to mimic a real audio traffic pattern during a VoIP call. The SIP validator then analyzes the audio echoed back looking for lost packets, delay and jitter, then uses an evaluation function to qualify the Internet connection. Optionally, it is possible to email the findings, as a detailed analysis report, to a person in charge of the investigation.

Redundant SBC fallback

The solution needs to support redundancy as its target environment requires high-availability in addition to a high degree of security. We introduced redundant paths to alternate BCA-SE and SBCs. The alternate BCA-SE and SBC server are made available so that our encryption client can re-establish the secure connection with an alternate in case of failure of the primary. This failover mechanism is triggered automatically when the CryptAgent client detects a connection drop with the BCA-SE. In this configuration each BCA-SE is paired with a different SBC server.

Figure 7:
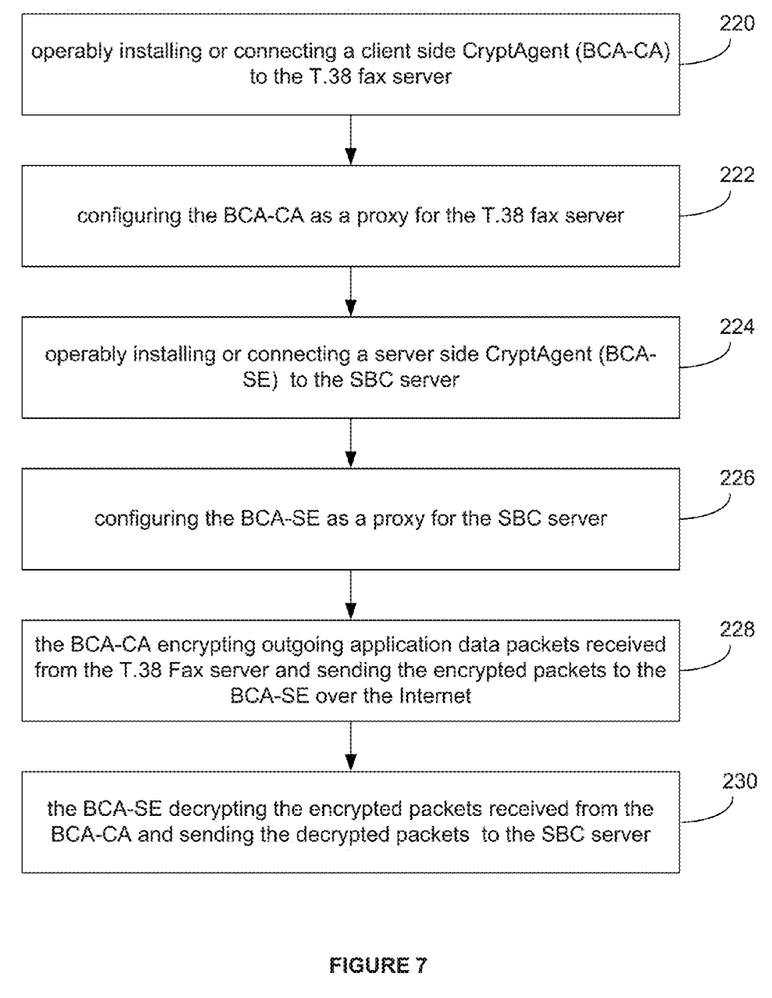
FIG. 7 is Flowchart of a method for securing Fax Over IP (FOIP) communications exchanged in real-time between a Fax server and a Session Border Controller (SBC) server, in accordance with an embodiment.

FIG. 7 is Flowchart of a method for securing Fax Over IP (FOIP) communications exchanged in real-time between a Fax server and a Session Border Controller (SBC) server, in accordance with an embodiment. As shown in FIG. 7, the method begins at step 220 by operably installing or connecting a client side CryptAgent (BCA-CA) to the T.38 fax server. Step 222 comprises configuring the BCA-CA as a proxy for the T.38 fax server. Step 224 comprises operably installing or connecting a server side CryptAgent (BCA-SE) to the SBC server. Step 226 comprises configuring the BCA-SE as a proxy for the SBC server. Step 228 comprises, at the BCA-CA, encrypting outgoing application data packets received from the T.38 Fax server and sending the encrypted packets to the BCA-SE over the Internet. Step 230 comprises, at the BCA-SE, decrypting the encrypted packets received from the BCA-CA and sending the decrypted packets to the SBC server.

Figure 8:
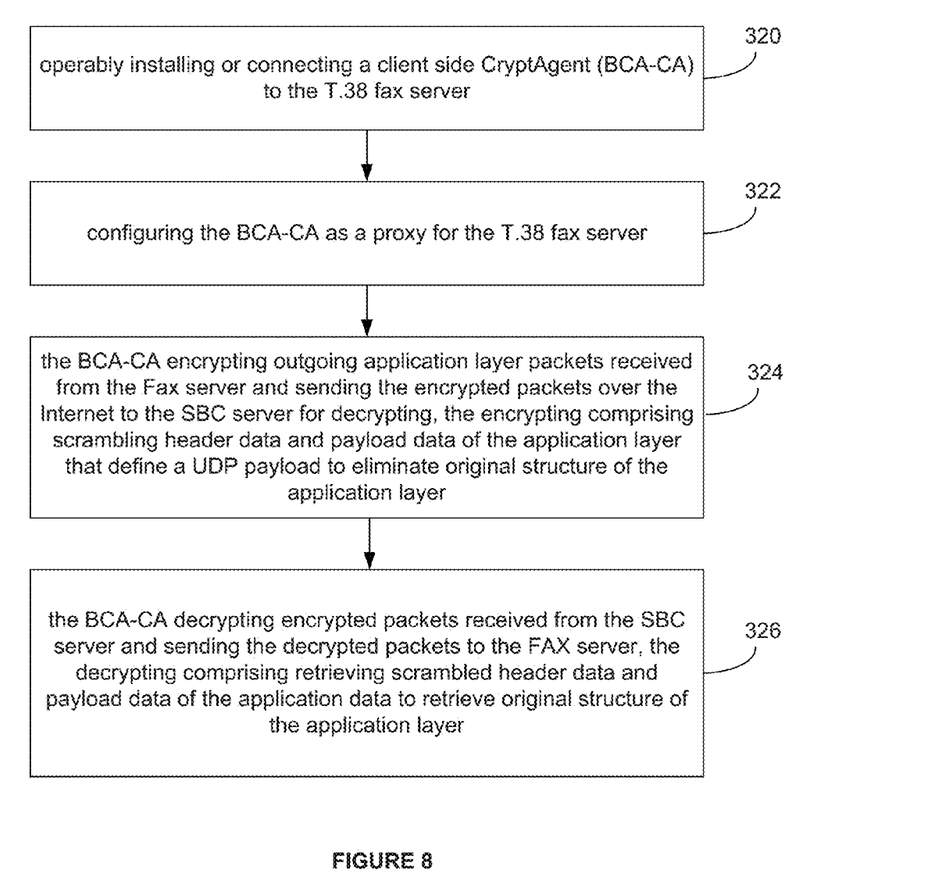
FIG. 8 is Flowchart of a method for securing Fax Over IP (FOIP) communications exchanged in real-time between a Fax server and a Session Border Controller (SBC) server, in accordance with another embodiment.

FIG. 8 is Flowchart of a method for securing Fax Over IP (FOIP) communications exchanged in real-time between a Fax server and a Session Border Controller (SBC) server, in accordance with another embodiment. The method begins at step 320 by operably installing or connecting a client side CryptAgent (BCA-CA) to the fax server. Step 322 comprises configuring the BCA-CA as a proxy for the fax server. Step 324 comprises, at the BCA-CA, encrypting outgoing application layer packets received from the Fax server and sending the encrypted packets over the Internet to the SBC server for decrypting, the encrypting comprising scrambling header data and payload data of the application layer that define a UDP payload to eliminate original structure of the application layer. Step 326 comprises, at the BCA-CA, decrypting encrypted packets received from the SBC server and sending the decrypted packets to the FAX server, the decrypting comprising retrieving scrambled header data and payload data of the application data to retrieve original structure of the application layer.

Figure 9:
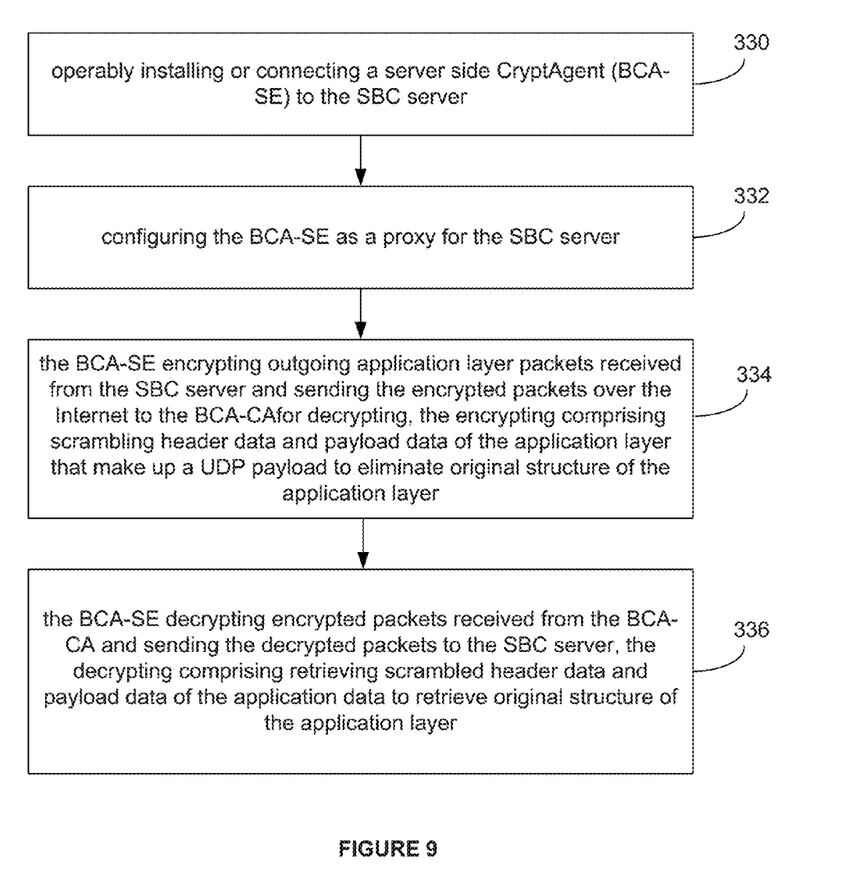
FIG. 9 is Flowchart of a method for securing Fax Over IP (FOIP) communications exchanged in real-time between a Fax server and a Session Border Controller (SBC) server, in accordance with a further embodiment.

FIG. 9 is Flowchart of a method for securing Fax Over IP (FOIP) communications exchanged in real-time between a Fax server and a Session Border Controller (SBC) server, in accordance with a further embodiment. Step 330 comprises operably installing or connecting a server side CryptAgent (BCA-SE) to the SBC server. Step 332 comprises configuring the BCA-SE as a proxy for the SBC server. Step 334 comprises the BCA-SE encrypting outgoing application layer packets received from the SBC server and sending the encrypted packets over the Internet to the BCA-CA for decrypting, the encrypting comprising scrambling header data and payload data of the application layer that make up a UDP payload to eliminate original structure of the application layer. Step 336 comprises the BCA-SE decrypting encrypted packets received from the BCA-CA and sending the decrypted packets to the SBC server, the decrypting comprising retrieving scrambled header data and payload data of the application data to retrieve original structure of the application layer.

Hardware and Computing Environment

Figure 10:
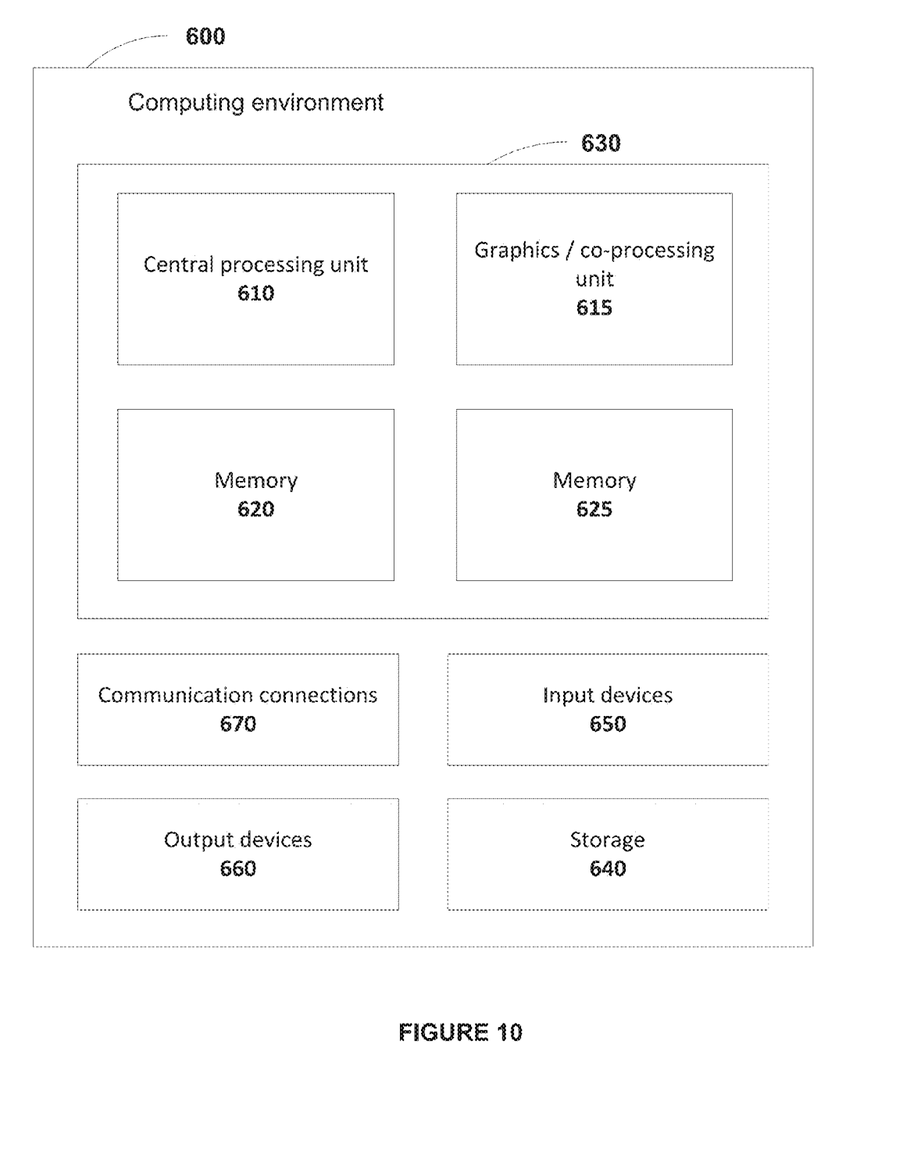
FIG. 10 illustrates a generalized example of a suitable computing environment in which the described embodiments may be implemented.

Embodiments of the system and method described herein can be implemented in a computing environment. FIG. 10 illustrates a generalized example of a suitable computing environment 600 in which the described embodiments may be implemented. The computing environment 600 is not intended to suggest any limitation as to scope of use or functionality, as the techniques and tools may be implemented in diverse general-purpose or special-purpose computing environments.

With reference to FIG. 10, the computing environment 600 includes at least one CPU 610 and associated memory 620 as well as at least one GPU or other co-processing unit 615 and associated memory 625 (used for example for video acceleration). In FIG. 10, this most basic configuration 630 is included within a dashed line. The processing unit 610 executes computer-executable instructions and may be a real or a virtual processor. In a multi-processing system, multiple processing units execute computer-executable instructions to increase processing power. A host encoder or decoder process offloads certain computationally intensive operations to the GPU 615. The memory 620,125 may be volatile memory (e.g., registers, cache, RAM), non-volatile memory (e.g., ROM, EEPROM, flash memory, etc.), or some combination of the two. The memory (620, 625) stores software 680 for a decoder implementing one or more of the decoder innovations described herein.

A computing environment may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The storage 640 may be removable or non-removable, and includes magnetic disks, magnetic tapes or cassettes, CD-ROMs, DVDs, or any other medium which can be used to store information and which can be accessed within the computing environment 600. The storage 640 stores instructions for the software 680.

The input device(s) 650 may be a touch input device such as a keyboard, mouse, pen, or trackball, a voice input device, a scanning device, or another device that provides input to the computing environment 600. For audio or video encoding, the input device(s) 650 may be a sound card, video card, TV tuner card, or similar device that accepts audio or video input in analog or digital form, or a CD-ROM or CD-RW that reads audio or video samples into the computing environment 600. The output device(s) 660 may be a display, printer, speaker, CD-writer, or another device that provides output from the computing environment 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 600, computer readable media include memory 620, storage 640, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description may use terms like "decide," "make" and "get" to describe computer operations in a computing environment. These terms are high-level abstractions for operations performed by a computer, and should not be confused with acts performed by a human being. The actual computer operations corresponding to these terms vary depending on implementation.

While preferred embodiments have been described above and illustrated in the accompanying drawings, it will be evident to those skilled in the art that modifications may be made without departing from this disclosure. Such modifications are considered as possible variants comprised in the scope of the disclosure and may include, without being limited to, variants for securing other types of media communication over IP, such as voice or video, in addition to T.38 fax.

The invention claimed is:

1. A method for securing Fax Over IP (FOIP) communications exchanged in real-time between a T.38 Fax server and a Session Border Controller (SBC) server, the method comprising:
- operably installing or connecting a client side CryptAgent (BCA-CA) to the T.38 fax server;
- configuring the BCA-CA as a proxy for the T.38 fax server;
- operably installing or connecting a server side CryptAgent (BCA-SE) to the SBC server;
- configuring the BCA-SE as a proxy for the SBC server;
- the BCA-CA encrypting outgoing application data packets received from the T.38 Fax server and sending the encrypted packets to the BCA-SE over the Internet; and
- the BCA-SE decrypting the encrypted packets received from the BCA-CA and sending the decrypted packets to the SBC server;
- thereby securing fax communications sent over the Internet using existing communication protocols.

2. The method of claim 1, further comprising encrypting the UDP data of the transport layer (the UDP payload), the encrypting comprising scrambling SIP application header data with SIP application payload data of the application layer to eliminate original structure of the application layer data.

3. The method of claim 1, further comprising:
- the BCA-CA implementing an authentication bridge on behalf of the T.38 Fax server to authenticate the Fax server with the SBC server.

4. The method of claim 1, further comprising: implementing a SIP validator module in the BCA-CA, the SIP validator module being configured to diagnose Firewall restrictions blocking communications between the fax server and the SBC server.

5. The method of claim 4, wherein the SIP validator module is adapted to mimic communication between the Fax server and the SBC server from a device residing in the same network and subject to the same firewall restrictions.

6. The method of claim 4, wherein the SIP validator module is adapted to send SIP INVITE messages to the SBC server and extract a public IP address and IP port used by the firewall from responses received from the SBC server to verify Consistent NAT behavior of the firewall.

7. The method of claim 4, wherein the SIP validator module is adapted to perform a network quality test including sending a series of packets consisting of real audio signals for a fixed duration to mimic a real audio traffic pattern during a VoIP call and determining the quality of the network from the echoed back packets based on a number of lost packets, delay and jitter.

8. The method of claim 1, further comprising:
prior to the encrypting, the BCA-CA initiating an HTTPS session with the BCA-SE and requesting encryption keys; and
performing the encryption using said encryption keys.

9. The method of claim 8, further comprising:
periodically updating the encryption keys and performing the encryption and decryption using the updated keys.

10. The method of claim 8, further comprising duplicating the BCS-SE and SBC servers for redundancy to ensure continuity of a current secure session between the Fax server and the SBC server.

11. The method of claim 1, further comprising:
the BCA-SE encrypting the application layer packets (SIP, RTP, UDPTL) received from the SBC and sending the encrypted packets to the BCA-CA;
the BCA-CA decrypting the encrypted packets received from the BCA-SE and sending the decrypted packets to the Fax server.

12. A memory having recorded thereon computer readable statements and instructions for implementing the method of claim 1.

13. The method of claim 1, further comprising:
the BCA-SE encrypting outgoing application layer packets received from the SBC server and sending the encrypted packets over the Internet to the BCA-CA for decrypting, the encrypting comprising scrambling header data and payload data of the application layer that make up a UDP payload to eliminate original structure of the application layer; and/or
the BCA-SE decrypting encrypted packets received from the BCA-CA and sending the decrypted packets to the SBC server, the decrypting comprising retrieving scrambled header data and payload data of the application data to retrieve original structure of the application layer.

* * * * *